March 30, 1954     A. G. HUPP     2,673,730

SPRING FOR SPRING CLUTCHES

Filed Oct. 28, 1948

INVENTOR.
Arleigh G. Hupp
BY
Andrus & Sceales
Attorneys

Patented Mar. 30, 1954

2,673,730

UNITED STATES PATENT OFFICE 2,673,730

SPRING FOR SPRING CLUTCHES

Arleigh Glynn Hupp, South Milwaukee, Wis.

Application October 28, 1948, Serial No. 57,017

1 Claim. (Cl. 267—1)

This invention relates to a spring for spring clutches, and method for making the same.

The spring is of the coil type for use in the clutching of rotary members by the radial expansion or contraction of the coil into engagement with one or both of the members.

Heretofore, coil springs for this type of clutch have been comparatively expensive to manufacture and in many instances the design of a satisfactory clutch was impossible due to the limitations imposed by reason of the requirements for manufacture of the coils under conditions imposing forming distortions and residual stresses therein and the impossibility of meeting necessary tolerances. A large number of rejects added to the cost and also to the uncertainty of quality.

This state of affairs is believed to be due largely to the methods heretofore thought necessary to manufacture the springs.

The present invention is based upon the concept of a radically different method of constructing the spring, one which provides a spring of reliable quality and close tolerance limits in both dimensions and physical properties.

According to the invention the spring is made from seamless tubing machined to accurate inside and outside diameters and cut on a spiral to provide the coil. The cross-section of each coil convolution is preferably rectangular with the major dimension expressed in radial thickness and with the sides of each convolution normally engaged by the adjacent convolutions to prevent independent twist of the convolutions in action. The teasing or operating end of the spring is made sensitive either by gradually tapering the axial thickness or the radial thickness of the convolutions to make the same thinner in either or both directions toward the end of the coil, and the coil is thus free from abrupt weak areas which are objectionable in concentrating stresses.

A spring made in accordance with the invention is illustrated in the accompanying drawings in which.

Springs of the character required for spring clutches should be capable of manufacture to very close tolerances in both physical properties and dimensions. Heretofore, such springs have been formed by coiling a drawn wire and then heat treating the coil and machining grooves in the convolutions at one end to make the same more sensitive.

This former process of manufacturing clutch springs has failed in many instances to produce springs of sufficiently uniform standards as to quality to make them readily replaceable or interchangeable. The wide tolerances in drawing and the inability to provide convolutions having the desired cross-section and flat outer surface greatly reduces the efficiency of the springs.

The present invention provides a coil spring having none of the limitations heretofore encountered and which spring simulates a rigid tube when the several convolutions are pressed tight together with each convolution engaging the adjacent convolutions along a spiral radially disposed flat surface extending substantially for the full thickness of the simulated tube. The outer surface of the simulated tube is truly cylindrical and serves as an efficient clutch surface of maximum capacity for the spring. Each convolution supports the adjacent convolutions in operation and prevents any possible twisting of individual convolutions and consequent misalignment of the clutching surfaces.

Figure 1:
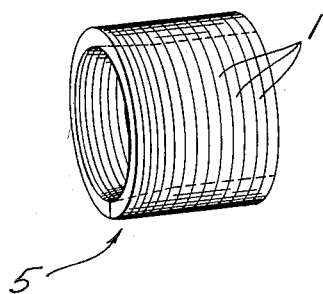
Figure 1 is a perspective view of the clutch spring.
Figure 2:
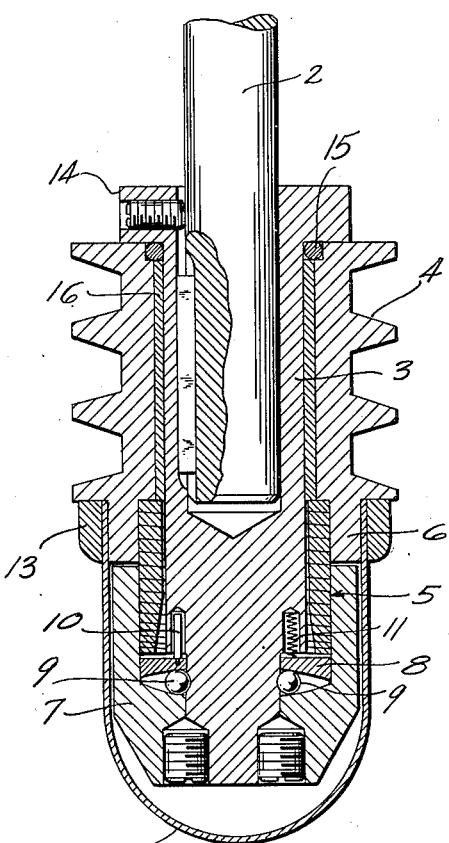
Fig. 2 is a longitudinal axial section of a clutch showing the spring assembled therein.

The spring illustrated in Figures 1 and 2 comprises a plurality of convolutions 1 constituting a single coil and each having a rectangular cross-section preferably with a major axis extending radially of the coil. The side edges of each convolution are close to the corresponding adjacent convolutions and preferably normally in light contact therewith.

The convolutions 1 are constituted preferably of a single strip of metal which is tapered in thickness at the operating end of the coil both radially and longitudinally of the coil so that the strip is thinnest and most sensitive at the actuating end of the coil.

The spring may be employed in various types of clutches, that illustrated in Fig. 2 being a typical automatic centrifugally actuated clutch.

The clutch of Fig. 2 comprises a drive shaft 2 with a flanged sleeve 3 keyed on the end thereof, a sheave 4 rotatably mounted on sleeve 3, and a clutch spring 5 disposed to rotate freely on the outer end of the sleeve.

The inner end of clutch spring 5 is set tightly into a recess in a hub extension 6 of sheave 4, so that the spring is normally held against rotation relative to the sheave and rotation of the spring tends to effect rotation of the sheave, particularly if the torque involved tends to expand the spring and thereby increase the tightness of its engagement with the sheave.

The outer clutch member 7 is secured to the outer end of sleeve 3 to rotate therewith and serves to enclose the outer end of spring 5 and the clutch operating mechanism. Member 7 has an inner cylindrical surface closely encircling the spring 5 with a normal clearance of about two thousandths of an inch therebetween and which surface constitutes the clutch surface opposing the outer clutch surface of the spring 5.

The clutch operating mechanism comprises an energizing ring 8 normally out of contact with the end of spring 5 but which is moved into contact therewith to actuate the clutch. A plurality of ball weights 9 are disposed between the ring 8 and the outer end of member 7 and serve to actuate the ring 8 in response to centrifugal action on the balls when the shaft 2, sleeve 3 and member 7 accelerate to a predetermined rotational speed. For this purpose the ball engaging surfaces of ring 8 and of member 7 are cone-shaped to provide for separation of the same upon outward radial movement of the balls 9.

The ring 8 is rotated with sleeve 3 by means of a plurality of circumferentially spaced longitudinally disposed pins 10 which slide in corresponding recesses in sleeve 3 and are press fit into ring 8 to serve as guides for the ring as the latter moves axially in actuating the clutch.

The ring 8 is normally held out of contact with spring 5 by means of a plurality of circumferentially spaced longitudinally disposed governor springs 11 set in corresponding recesses in sleeve 3 intermediate the recesses for pins 10. Springs 11 are small coil springs which engage ring 8 and bias the same outwardly against balls 9 at all times. The strength of springs 11 as related to the spreading forces exerted between ring 8 and member 7 by balls 9 determines the rotational speed for accelerating shaft 2 at which the clutch will close and drive sheave 4, and also the rotational speed for decelerating shaft 2 at which the clutch will open and free sheave 4 from the driving torque under no load conditions.

The clutch is closed by a light engagement of rotating ring 8 with the non-rotating outer end of spring 5 whereupon the rotational torque teases the sensitive outer convolution in a rotational direction tending to unwind or expand the spring. The end convolution of spring 5 thereupon expands into contact with the clutching surface of outer member 7 and an immediate expansion of all of the free convolutions of spring 5 occurs to effect an instantaneous and complete interengagement of the clutching surfaces.

The driving torque is transmitted from rotating clutch member 7 through spring 5 to sheave 4. The clutch is of the over-running free wheeling type which remains closed so long as it is under load and which releases under no load conditions wherein the drive shaft decelerates faster than the sheave provided that the balls 9 drop back to allow the governor springs 11 to move the energizing ring 8 away from the end of spring 5.

When the clutch is closed the convolutions of spring 5 are tightly expanded against the clutch surface of outer member 7 and present in effect a rigid tube having a drive fit with both member 7 and sheave 4. The greater the torque, the greater the tightness of spring 5 in both member 7 and sheave 4. By providing a clutch surface of sufficient area and a sufficient diameter for the clutch surface, almost any torque load can be transmitted by the clutch within the limits of the shear value for the spring 5 across the juncture between sheave 4 and member 7.

In order to prevent undue stress upon spring 5 at the juncture of sheave 4 and clutch member 7 it is preferable to provide a slight gradual enlargement of the mouth of the recess in sheave 4 that receives the inner end of the spring so that the diameter of the recess at its mouth corresponds substantially to the inside diameter of the clutch surface of member 7.

If desired, the entire clutch assembly may be covered by a cap 12 which is constructed of thin sheet metal and is press fitted onto a shoulder extension of sheave 4. A tight retaining ring 13 secures cap 12 in place.

The sheave 4 is prevented from axial movement inwardly on shaft 2 by means of a flange 14 on the inner end of sleeve 3, and an O-ring 15 serves to reduce the frictional bearing surface between sheave 4 and flange 14. A suitable bearing bushing 16 is mounted on sleeve 3 for rotatably supporting the sheave 4.

The clutch spring 5, which is the subject of the present invention, is constructed to very close tolerances in both physical properties and dimensions by a few simple and relatively inexpensive manufacturing steps.

A typical spring may be made from a sized seamless steel tube of a suitable composition such as S. A. E. 6150 steel of fine grain size, annealed structure. For this purpose an aluminum killed steel has been found most satisfactory. The tube should be of the general thickness and diameters of the desired spring, it being preferable to start with an excess thickness.

The tubular blank is then fed through the hollow spindle of a lathe or of any machine designed for machining purposes and is chucked therein when the working end protrudes a distance corresponding to the length of the desired spring plus the width of the cutting tool required to sever the same.

The tube is then machined inside and out to accurate diameters and thickness. If it is desired to have the teaser end of the spring tapered in wall thickness this is done by tapering the inside diameter of the tube at its outer end.

The tube is then cut into a coil by utilizing a tool mounted on a carriage operated by a cam controlled in co-relation to the spindle rotation and providing for square cutting of the convolutions and if desired for a progressive gradual increase of the axial thickness of each convolution from the outer end to cooperate with the tapered thickness previously referred to for the teaser end of the coil.

The coil is then cut off at the chuck. At this stage it is free from any forming stresses, but the convolutions are spaced apart a distance equal to the width of the cutting tool and the coil is too long.

The coil is then compressed longitudinally upon an arbor which secures the alignment of the convolutions and also holds the convolutions in close engagement with one another. The compressed and secured coil is then heat treated in a controlled atmosphere or neutral salt bath and quenched to remove the slight spring back stress resulting from the longitudinal compression thereof and to provide the desired spring resilience and set therein.

After heat treatment the coil is removed from the arbor and hone-speened, sand-blasted or acid treated to remove any slight scale. The coil is then finished and ready for use as the spring 5.

Figure 3:
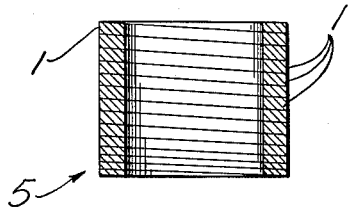
Fig. 3 is an axial section of a modified form of spring.

If desired, the radial thickness of the convolutions may be uniform throughout the length of the spring 5, and the teaser end of the coil may have the convolutions gradually thinned in axial thickness on a taper toward the end, as shown in Fig. 3.

Figure 4:
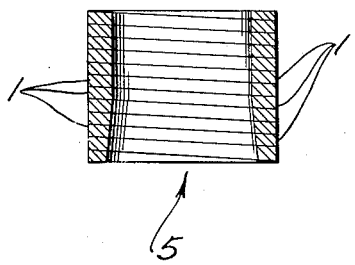
Fig. 4 is a similar section of a modified form of spring.

Similarly, the axial thickness of the convolutions may be kept uniform and the radial thickness may be tapered sufficiently for sensitive teasing, as shown in Fig. 4.

Various methods of cutting the coil from a tubular blank may be employed and various cross-sectional shapes may be desired for the convolutions. The heat treatment employed should be established to suit the particular steel or alloy used.

I claim:

A metal clutch spring of the class described having a cylindrical clutch surface and of close tolerance in properties and dimensions and adapted to be radially expanded and contracted in actuation, comprising a tubular member circumferentially machined inside and outside to provide a wall having one cylindrical surface and of tapered radial thickness toward one end, the wall of said tubular member being cut along a substantially radial spiral line into a plurality of spiral convolutions, each convolution being of substantially rectangular section and the convolutions at the radially tapered end having a tapered axial dimension which longitudinally reduces the sections toward the tin end of the wall, each convolution of the spring wall closely engaging adjacent convolutions when the spring is compressed to present a continuous cylindrical surface free of any tendency for the convolutions to twist, and said spring being in a heat treated condition, normalized and set to final dimensions in an axially closed dimensional state.

ARLEIGH GLYNN HUPP.

References Cited in the file of this patent

UNITED STATES PATENTS

| Number | Name | Date |
|---|---|---|
| 41,950 | Vose | Mar. 15, 1864 |
| 843,827 | Knudson | Feb. 12, 1907 |
| 981,389 | Dearborn | Jan. 10, 1911 |
| 1,266,550 | Carroll | May 21, 1918 |
| 1,935,147 | Drexler | Nov. 14, 1933 |
| 2,098,021 | Wheeler | Nov. 2, 1937 |
| 2,211,761 | Berg et al. | Aug. 20, 1940 |
| 2,257,987 | Starkey | Oct. 7, 1941 |
| 2,358,707 | Haas | Sept. 19, 1944 |
| 2,459,972 | Starkey | Jan. 25, 1949 |

FOREIGN PATENTS

| Number | Country | Date |
|---|---|---|
| 29,507 | Australia | Aug. 10, 1907 |
| 360,740 | Great Britain | Aug. 12, 1931 |